UNITED STATES PATENT OFFICE.

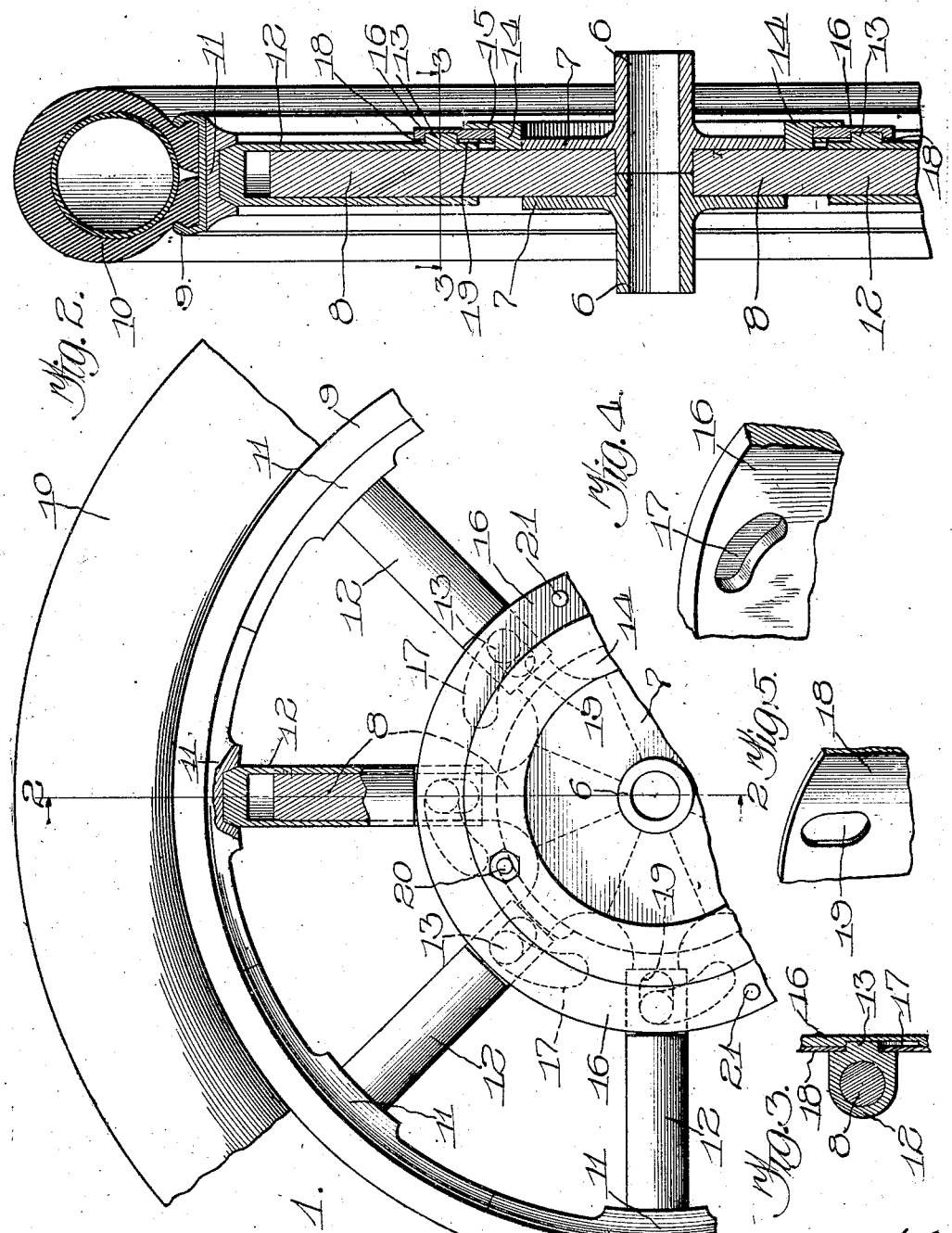

ROSWELL H. BUCKINGHAM, OF BARBERTON, OHIO, ASSIGNOR OF ONE-HALF TO HIMSELF, AND ONE-HALF TO CHARLES E. PICKARD, OF CHICAGO, ILLINOIS.

REMOVABLE-RIM WHEEL.

954,076.  Specification of Letters Patent.  Patented Apr. 5, 1910.

Application filed September 30, 1908. Serial No. 455,491.

*To all whom it may concern:*

Be it known that I, ROSWELL H. BUCKINGHAM, a citizen of the United States, residing at Barberton, in the county of Summit and State of Ohio, have invented certain new and useful Improvements in Removable-Rim Wheels, of which the following is a specification, reference being had to the accompanying drawings.

My invention relates to wheels with removable rims, particularly to wheels of that description adapted for use in self-propelled vehicles. As is well known in self-propelled vehicles as well as less commonly in other vehicles, wheels with resilient tires are used, and these tires are liable to injury from puncture or tearing or from the ordinary wear and tear of the running of the vehicle, and have to be removed and replaced by other tires. It is of course desirable that the tires thus injured should be able to be removed and new tires put in their place as readily and as speedily as possible, and many devices intending to accomplish that end have been constructed.

In my invention, instead of having the elastic tire only removed from the wheel, I remove the tire and rim to which it is attached, and it is the object of my invention to provide a new and improved form of wheel in which the resilient tire and rim may be both readily removed together, and a new tire and rim readily and speedily placed upon the wheel, and firmly locked in position so that the rim and tire can not be accidentally removed, but at the same time may be readily removed whenever desired. I accomplish this object as illustrated in the drawings and as hereinafter described.

What I regard as new is set forth in the claims.

In the drawings,—Figure 1 is a side elevation of a portion of a wheel, embodying my improved construction, showing one of the spokes partially in vertical section; Fig. 2 is a section on line 2—2 of Fig. 1; Fig. 3 is a section on line 3—3 of Fig. 2; Fig. 4 is an enlarged detail, being a broken away portion of the operating ring seen from the inside, and showing the cam slot; Fig. 5 is an enlarged detail, being a broken away portion of the inner ring, showing the radial slot.

6 indicates a hub of a wheel which, as is best shown in Fig. 2, preferably consists of two sections.

7 indicate circumferential flanges on the hub 6, which are preferably formed integral therewith, and are spaced apart to receive and hold firmly between them spokes 8, which are rigidly seated in the hub in any well known and approved manner between the flanges 7.

9 indicates the rim which may support any suitable resilient tire, as 10, secured to the rim 9 in any well known and approved manner. The rim 9 is provided on its inner surface with a plurality of sockets 11, which are preferably, as shown, made of separate pieces secured to the rim 9, but may be integral therewith. The sockets 11 of course equal in number the number of the spokes 8. The openings in the sockets 11 are preferably tapered to receive the tapered ends of sleeves 12, which are formed of any suitable material and telescope on the spokes 8. The spokes 8 are adapted to fit closely and snugly within the sleeves 12, so that there will not be any waste motion, but nevertheless so that the sleeves 12 may slide on the spokes 8 longitudinally of themselves and radially of the wheel. Toward their inner ends the sleeves 12 are preferably flattened upon one surface, as is best shown in Fig. 3, to afford a bearing for the parts hereinafter described, and are provided each with a stud or pin 13 projecting outward therefrom.

14 indicates a bearing ring, preferably of metal, which is seated upon one of the flanges 7, bearing upon the external periphery of said flange, and is rigidly held in place either by fastening it to the spokes 8, or in any suitable manner. The bearing ring 14 is provided with a circumferential flange 15, located upon the outer edge of its periphery, a suitable distance away from the spokes.

16 indicates an operating ring, which is rotatably mounted upon the bearing ring 14, bearing against the inner surface of the flange 15. The inner surface of the operating ring 16 is provided with a number of cam slots 17, best shown in Fig. 4, which equal in number the number of spokes, and are adapted to register with and engage the studs 13. It will be obvious that when the operating ring 16 is rotated, the engagement of the cam slots 17 with the studs 13 will cause the sleeves 12 to simultaneously move radially either inward or outward from their original position, according to their position in the slot and the direction of rotation of the operating ring 16. The slots, as is best shown in Figs. 2 and 4, are in the form of recesses cut only partly through the operating ring 16, and from the inner surface, in order to protect the parts against dirt and prevent the slots 17 from being filled with dust and dirt.

18 indicates a protecting ring which is mounted upon the periphery of the bearing ring 14 and rigidly held thereon in any suitable manner, its outer surface bearing against the inner surface of the operating ring 16, so that the said operating ring rotates between the flange 15 and the said protecting ring. The protecting ring 18 is provided with a plurality of radially located slots 19 through which the studs 13 pass. These openings 19 are of sufficient length to permit a sufficient radial movement inward and outward of the sleeves 12 to engage and disengage their ends from the sockets 11. The object of the protecting ring 18 is to cover the slots 17 on the operating ring 16 from the inside, so as to prevent the entrance of dirt. This will be readily seen from Fig. 3 where the relative position of the several slots is best shown. In this figure, as will be seen, the slots 19 in the ring 18 are narrower than the flattened portion of the sleeves 12 against which the ring bears, and the sides of the ring 18 cover the cam slots 17, so as to prevent the entrance of dirt.

20 indicates a bolt which, passing through the various parts, may be turned to lock them firmly together, and preventing the rotation of the operating ring 18, will prevent the accidental separation of the rim and the wheel, while by loosening the bolt the part may be turned. The cam slots themselves are so shaped, as will be seen from Figs. 1 and 4, that when the wheel is put together for use, any pressure exerted radially along the spokes will not tend by the engagement of the pin with the cam slot to rotate the ring and separate the parts.

The operation of this device will be readily understood. When it is desired to remove the rim, the operating ring, by means of any suitable tool, as by a spanner, applied to the pins, 21, is rotated from left to right in Fig. 1. This movement will cause the sleeves 12 to move simultaneously radially inward, freeing their ends from engagement with the sockets 11. The rim, of course, is then removed from the wheel and a new rim and tire put in position, the operating ring then being rotated from right to left in Fig. 1; throwing all the sleeves radially outward into engagement with the sockets. The parts are then locked by the bolt 20, and the wheel is in condition for use.

I have shown my wheel as constructed with only eight spokes, which, of course, is only for the convenience of illustration, as any number may be used. I have also shown it with a resilient tire of the ordinary pneumatic outer and inner tube type, but of course any form of tire may be used, as may be preferred.

That which I claim as my invention, and desire to secure by Letters Patent, is,—

1. The combination with a rim and a hub of telescopic spokes seated in said hub and adapted at their outer ends when extended to engage said rim and to be disengaged therefrom when retracted, means for simultaneously telescoping said spokes and moving them into and out of engagement with said rim, and means for locking said spokes in their extended position.

2. The combination with a rigid rim, a hub, and spokes rigidly mounted in said hub, of sleeves slidingly mounted on said spokes, and adapted when extended to engage said rim at their free ends, means for simultaneously moving said sleeves on said spokes longitudinally of themselves into and out of engagement with said rim, and means for locking said sleeves in their extended position in engagement with said rim.

3. The combination with a rigid rim, a hub, and spokes rigidly mounted in said hub, of sleeves slidingly mounted on said spokes, and adapted at their outer ends when extended to engage said rim, and when retracted to be disengaged therefrom, a rotatable ring mounted on said hub, cam recesses on said ring adapted to engage said sleeves and by the rotation of said ring to move said sleeves radially on said spokes into and out of engagement with said rim, and means for locking said ring against rotation.

4. The combination with a rigid rim, a hub, and spokes rigidly mounted in said hub, of sleeves slidingly mounted on said spokes and adapted when extended to engage said rim at their outer ends and when retracted to be withdrawn therefrom, pins mounted one on each of said sleeves, a rotatable ring carried on said hub and having on its inner surface cam recesses sunk in said ring and not projecting through the same, and adapted each to engage a pin on one of said sleeves, and means for locking said ring against rotation.

5. The combination with a rigid rim, sockets on the interior surface of said rim, a hub, and spokes rigidly mounted in said hub, of sleeves slidingly mounted on said spokes and adapted when extended to engage said sockets at their outer ends and when retracted to be disengaged therefrom, pins mounted one on each of said sleeves, a rotatable ring carried on said hub and having on its inner surface cam recesses sunk in said ring and not projecting through the same, and adapted each to engage a pin on one of said sleeves, and means for locking said ring against rotation.

6. The combination with a rigid rim, sockets on said rim, a hub, and spokes rigidly mounted in said hub, of sleeves mounted on said spokes movable longitudinally thereon, and adapted when extended to engage said sockets at their outer ends and flattened upon one side near their inner ends, pins mounted one on each of said sleeves and projecting from the flattened portion thereof, an operating ring rotatably mounted on said hub and having cam recesses sunk partially through the said ring from its inner side, and adapted each to engage one of said pins, a protecting plate carried on said hub between said operating ring and said spokes and having radial slots through which said pins pass, and means for locking said operating ring against rotation.

7. The combination with a rigid rim, sockets on said rim, a hub, and spokes rigidly mounted in said hub, of sleeves carried by the said spokes, adapted at their outer ends when extended to engage said sockets, and flattened upon one side near their inner ends, a pin on the flattened portion of said sleeves, a bearing ring mounted on said hub, and having an annular flange, an operating ring rotatably mounted on said bearing ring with its external surface bearing upon the internal surface of the said flange, and having cam recesses sunk into its inner surface and adapted each to engage one of said pins, a protecting plate rigidly carried by said bearing ring between said sleeves and said operating ring, and having radial slots through which said pins pass.

8. The combination with a rigid rim, sockets on said rim, a hub, and spokes rigidly mounted in said hub, of sleeves carried by said spokes, adapted at their outer ends when extended to engage said sockets, and having a flat bearing surface upon one side near their inner ends, a pin on the flattened portion of said sleeve, a bearing ring mounted on said hub, and having an annular flange, an operating ring rotatably mounted on said bearing ring with its external surface bearing upon the internal surface of the said flange, and having cam recesses sunk in its inner surface and adapted each to engage one of said pins, a protecting plate rigidly carried by said bearing ring between said sleeves and said operating ring, and having radial slots through which said pins pass, and means for locking said operating ring against rotation.

ROSWELL H. BUCKINGHAM.

Witnesses:
S. A. DECKER,
W. A. MORTON.